United States Patent
Bueno Ruiz et al.

(10) Patent No.: US 6,479,800 B1
(45) Date of Patent: Nov. 12, 2002

(54) REMOTE ACTIVATION MECHANISM FOR EQUIPMENT REGULATED DEPLOYMENT OR RELEASE

(75) Inventors: Jose Ignacio Bueno Ruiz, Bilbao-Vizcaya (ES); Javier Vazquez Mato, Barakaldo-Vizcaya (ES)

(73) Assignee: Sener, Ingenieria Y Sistemas, S.A. (ES)

( * ) Notice: Subject to any disclaimer, the term of this patent is extended or adjusted under 35 U.S.C. 154(b) by 0 days.

(21) Appl. No.: 10/042,643

(22) Filed: Jan. 8, 2002

(51) Int. Cl.⁷ .............................. H05B 3/06; H05B 3/02; B64D 1/12; F16F 9/12; B64G 1/64
(52) U.S. Cl. ................... 219/424; 219/200; 219/202; 219/521; 219/385; 244/137.4; 403/28; 403/404
(58) Field of Search ................. 219/385, 200, 219/201, 202, 209, 221, 521, 522, 526, 534, 535, 424; 244/137.4; 403/315, 322.1, 404, 28

(56) References Cited

U.S. PATENT DOCUMENTS

| | | | | |
|---|---|---|---|---|
| 4,430,552 A | * | 2/1984 | Peterson | 219/200 |
| 4,540,873 A | * | 9/1985 | Kester | 219/200 |
| 4,842,106 A | * | 6/1989 | Ludwig et al. | 188/266 |
| 5,095,595 A | * | 3/1992 | Stella et al. | 403/404 |
| 5,520,476 A | * | 5/1996 | Marks et al. | 403/322 |
| 5,718,531 A | * | 2/1998 | Mutschler, Jr. et al. | 403/404 |
| 5,921,357 A | * | 7/1999 | Starkovich et al. | 188/290 |

FOREIGN PATENT DOCUMENTS

GB         2062960       * 5/1981

* cited by examiner

*Primary Examiner*—Joseph Pelham
(74) *Attorney, Agent, or Firm*—Ostrolenk, Faber, Gerb & Soffen, LLP

(57) ABSTRACT

Remote activation mechanism for equipment regulated deployment or release, that includes a cylindrical housing (1), connected by means of a rod (10) with the external equipment to be deployed including the acting mechanism, and has adhered a fusible material band in its internal surface (11). Inside the housing a cylindrical frame (2) connected with the fixed part of the equipment is disposed. That frame is provided with means to perform the local and progressive fusion of the fusible material band. Additionally a cylindrical sealing piece (3) is disposed in between the fusible material band (11) and the frame (2).

6 Claims, 3 Drawing Sheets

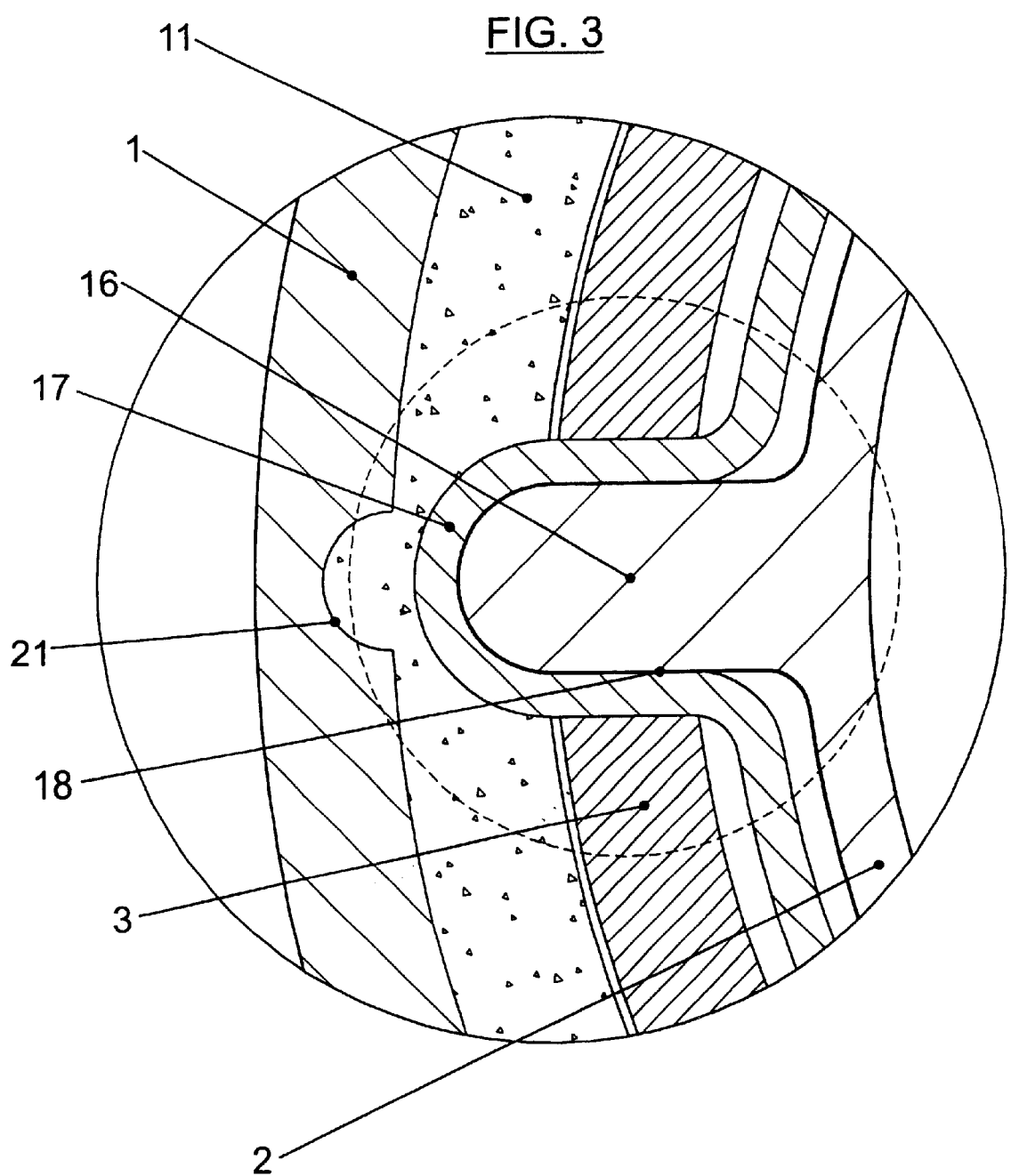

REMOTE ACTIVATION MECHANISM FOR EQUIPMENT REGULATED DEPLOYMENT OR RELEASE

The present invention refers to a remote activation mechanism for equipment regulated deployment or release, being the deployment lineal or rotational. The is specially applicable in deployable antennas and other deployable appendages or ejectable equipment of space vehicles, oceanographic equipment, aeronautics, military equipment, etc., where the elimination of the typical end deployment shock of spring driven deployable systems is mandatory.

Space vehicle deployable appendages acted by means of springs without including any regulation system, one liberated of their hold-down point to begin their deployment, are accelerated in a uncontrolled way until reaching the deployment stroke end stop, on which they impact, transmitting a severe shock to the vehicle main structure. At the end of the deployment, when the appendage reaches the mechanical end stop, the energy stored by the spring has been transferred to the appendage in form of kinetic energy meaning that the appendage has a significant speed when it reaches the deployment end stop. The severe shock transmitted to the structure of the space vehicle can endanger its stability, the structural integrity, the base of the appendage, and also the survival of delicate equipment located close to the appendage, such as electronic and radio-frequency equipment.

Due to that, when a system of springs is used to provide the necessary torque (force if lineal instead of rotational) to deploy an appendage, for example in a space vehicle, a system that reduces the end deployment shock causes by the collision of the appendage against the mechanical end stop, is also implemented. In that way, the maximum deployment speed achieved by the excess of transmitted torque is significantly reduced.

There are several devices dedicated to such a function. They are described immediately afterwards.

a) Eddy current dampers, which are based on the generation of electric currents induced in a copper disk rotating in a magnetic field generated by several couples of magnets located at both sides of the disk. These electric currents induced in the disk cause a torque in the disk proportional to the appendage rotational speed, contrary to the acting motor torque. There is no contact between the disk and the magnets. This system needs that the disk rotates to very high speed, requiring a system that multiplies the appendage deployment speed (e.g. gear train). Those systems have the advantage of not needing electric power supply, but they have important inconveniences such as a significant weight, a great friction torque due to the gear train and a high cost. Additionally, they usually need also external thermal control to be able to operate properly at temperatures below 0° C.

b) Viscous dampers based on forcing a viscous fluid to go by narrow grooves. The flow of viscous fluid passes through the grooves when a difference of pressure between both parts of the grooves is generated. This difference of pressure provides a resistive torque proportional to the appendage rotational speed, contrary to the acting motor torque. These systems have the inconvenience that their behaviour changes significantly with the temperature due to the variation of the fluid viscosity. Additionally, those kind of devices also have associated a high risk of contamination due to the possibility of leakage of the fluid out of its cavity, mainly in operation due to the significant increment of pressure that has to undergone this fluid. The leakage of the fluid could mean the loss of damping behaviour, increasing the risk of the appendage overload in the deployment when the deployment is carried out after a considerable time from the assembly of the viscous damper. A particular kind of viscous damper are those using material of low melting temperature material instead of a viscous fluid (e.g. paraffin, alloys of low melting point, . . .). That is to say that the material needs an energy contribution to start the deployment in order to reach its liquid state, allowing the appendage to start its deployment. Once the material melts, it behaves as a viscous damper. As in those devices the melting temperature is above the operational temperature range of the system, the provided damping is more repetitive. Those systems have the inconvenience of the necessary energy contribution to fuse the whole low melting alloy material and also the loss of heat though the elements forming the cavity containing the material to be melted.

c) Friction dampers based on the generation of friction forces that cause a resistive torque proportional to the appendage rotational speed, contrary to the acting motor torque. This friction force is generated by some brake shoes that contact with a cylindrically disposed friction pad. Shoes and pad get in contact due to the centrifugal force that acts on the rotating shoes. Therefore, the more the rotational speed, the more the centrifugal force on the shoes against the friction pad, the more the force in the contact, and the more the friction force. Those systems need high rotation speed, requiring an additional device that multiplies the appendage deployment speed (e.g., gear train). This system has the advantage of not needing electric power supply, but it has important inconveniences such as the variability of the friction coefficient, and a great friction torque due to the gear train. Additionally, it usually needs also of external thermal control to be able to operate properly at temperatures below 0° C.

There is another system to reduce the end deployment shock based on the absorption of the kinetic energy at the end of deployment by deforming plasticity a metallic piece of honeycomb with its cells vertically faced to the appendage movement. In fact it is a semirigid end stop. Their main inconveniences are its lack of precise positioning of the appendage at the end of deployment, and its capacity to absorb only a part of the total energy (not enough in most cases).

In order to solve the inconveniences of the described devices it was thought of a simple, economic and reliable device able to regulate the movement of a deployable appendage, maintaining their deployment speed inside reasonable limits as to make that the shock at the deployment end is minimum, eliminating the risk of damaging the space vehicle. This would mean a substantial improvement of the spring driven deployable systems. This device should have the following characteristics.

a) Minimum internal friction during operation
b) Non contaminating
c) Conceptual simplicity and simple operation
d) Reliable
e) Light
f) Reusable
g) Easy rearming without dismounting it from its location, without necessity of electric disconnection, eliminating the risks associated with the assembly and disassembly.
h) Electrical redundant activation, if necessary.

i) Long life without degradation.

j) Cheap

In order to solve most of the identified inconveniences of the existing devices the use of any gear train has been avoided to reduce its internal friction and to increase its reliability. Also, the use of non metallic viscous fluids has been rejected in order to avoid any risk of contamination.

It was identified that the advance speed (lineal or rotational) could be directly related with the speed a low melting temperature material band fuses. For doing that, the heat flow to be transmitted to the low melting temperature alloy should be concentrated in the point of the band that blocks the movement, and therefore in the area of the band that is direct load path. Obviously, this material should have its melting point sufficiently low as to maintain reasonably low the necessary energy contribution.

The use of metallic alloys of low melting point was chosen for the melting band due to the following reasons.

a) No outgassing in vacuum conditions.

b) There are several low melting temperature metallic alloys with different melting points.

c) Their thermal conductivity is much lower than the metallic piece pressing on it (cooper).

d) Their latent heat of fusion is reasonably high as to avoid a quick melt of the fusible alloy.

e) Their mechanical characteristics when solid are high enough to need only a small section of melting material.

f) Their adherence to metals is good while their adherence to low friction plastics is very poor.

The presented objectives are achieved in the apparatus object of the present invention. It is based on the progressive fusion of a band of low melting temperature metallic alloy by means of a heating element. This band of fusible alloy is adhered to the internal surface of an external moving housing, being the heating element fixed to an internal frame which is faced to the external housing. When the heating element has not still being provided with enough heat as to begin to fuse the material of low melting point, this element blocks all movement between housing and frame.

The heating element consists of a strip of a material with high thermal conductivity (for example copper or any other similar material), conformed on a protrusion of the internal housing, which extends to both sides of the protrusion around the internal frame. One or several electric heaters are placed on this copper sheet so that the heat provided by these heaters is transmitted by conduction to the copper sheet part located on the protrusion. The part of the copper sheet on the protrusion increases its temperature up to achieving the temperature corresponding to the temperature of fusion of the fusible alloy of the band. Then, all added energy will be used to start the progressive fusion of the melting material. The material band to be melted is pressed by the heating element due to the action of an external torque source. The apparatus is designed as to allow the relative movement between the external housing and the internal frame. Therefore the internal frame with its protrusion moves slowly respect to the external housing as the fusion of the fusible alloy band progresses.

The part of the fusible alloy that becomes liquid passes behind the protrusion due to the pressure made by the protrusion on the band.

In order to avoid any liquid leakage possibility, a sealing system allowing the relative movement but containing the melted alloy is provided. This seal is disposed around the protrusion eliminating the possibility that the fused material penetrates in the cavity where the heaters are installed. This seal has the following functions:

a) It performs the contention of the melting alloy avoiding any leakage out of the housing. A low friction plastic has been selected to perform that function, as there are some sliding surfaces between the sealing material and the housing.

b) As sealing material has low friction properties, the melting alloy does not adhere to it when it solidifies again. At the contrary it will adhere to the external housing material again.

c) During assembly, a small gap is left between the seal and the fusible alloy in order to minimise the internal frictions.

d) As the seal coefficient of thermal expansion is higher than the one of the melting material, when the fusible alloy solidifies again, the gap between the seal and the fusible alloy will appear again maintaining the low internal friction.

e) As the seal material has low thermal conductivity, it will provide good thermal isolation to the cavity where the heaters are allocated (on the copper sheet), providing a better thermal efficiency, and directing the main part of the heating flux towards the heating element on the internal frame protrusion.

Since the thermal conductivity of the fusible alloy is quite smaller than that of the copper, and since an additional contribution of heat is necessary to carry out the state change (from solid to liquid), the advance speed can be adjusted varying the electric power provided to the heaters allocated on the copper sheet.

The fusible alloy should be selected in function of its melting temperature, which should be as small as possible but above the operational temperature range of the system.

Low melting metallic alloys have clear advantages in front of other materials.

a) There are several low melting temperature metallic alloys with different melting points, providing acceptable mechanical characteristics under load even at temperatures close to the melting point.

b) They do not cause outgassing under vacuum conditions.

c) Their volume variation with the change of state (solid to liquid) is negligible d) They can be eutectic or non-eutectic.

e) Their adherence to metals is good, while their adherence to low friction plastics is very poor. Therefore, manufacturing the housing from a metal with provision to withstand the shear loads (e.g. grooves or similar),the adherence between housing and fusible alloy band is guaranteed. Additionally, when it solidifies again, that solidification will be performed on the housing internal surface and not on the seal surface.

f) Their thermal conductivity is much lower than the metallic piece pressing on it (cooper).

g) Their latent heat of fusion is reasonably high as to avoid a quick fusion of the fusible alloy.

h) Their mechanical characteristics when solid are high enough to need only a small section of melting material.

That fusible alloy band can be disposed in a lineal way or with a cylindrical shape.

In the case the band is disposed in lineal configuration, once the device is not electrically powered and the temperature is below the melting point temperature of the band material, the device can be used in backwards direction in the same way the advance was performed, provided that there is an external force acting backwards.

In the case the band is disposed in cylindrical configuration, once the device is not electrically powered and the temperature is below the melting point temperature of the material band, the device can be used to regulate additional advance rotational movements as well as to regulate backward rotational movements in the same way the first advance was performed, provided that there is an external torque acting in the advance or in the backward direction.

In this last case (cylindrical configuration) the selected constructive solution (although there are other possibilities) is the one composed by a cylindrical frame with a longitudinal protrusion responsible of transmitting the torque. A strip of material with very good thermal conductivity (copper has been chosen) is conformed hugging the longitudinal protrusion, being extended to both sides of it without maintaining direct contact with the cylindrical frame by disposing a isolation tape in between. One or several electric heaters are placed on both sides of this copper sheet so that the heat provided is transmitted by conduction to the copper sheet.

The protrusion with the copper sheet conformed on is named as thermal key.

A cylindrical piece made of low friction plastic material is disposed around that set, having containment and sealing function. That cylindrical piece is provided with a longitudinal slot that allows the thermal key to stand out of the external cylindrical surface. Therefore, the cylindrical piece surrounds and embraces the thermal key. At the ends of the external cylindrical surface, where it makes contact and slides against the housing, circular grooves have been disposed to increase the sealing effectiveness, and to avoid potential leakage of the fusible alloy when it is in liquid state.

The fusible alloy band is disposed firmly adhered to the internal surface of the housing. It has a longitudinal groove to provide geometric compatibility with the thermal key when the fusible alloy is solid, making impossible any relative rotation between the internal frame (with the thermal key and the seal) and the external housing (with the fusible alloy band). Relative rotation between both only is possible when the fusible alloy starts melting due to the heat provided by the thermal key which is pressing the band by the effect of an external acting torque.

The characteristics of the deployment regulator are understood more easily with the following description carried out with reference to the enclosed drawings, in which a possible realisation form is represented. Although an specific arrangement of the present invention is here below described with reference to the drawings, it should be understood that such arrangement is by way of example only and merely illustrative of a possible arrangement of the many possible specific arrangements which can represent applications of the principles of the present invention. Various changes and modifications obvious to one skilled in the art related with the present invention are deemed to be within the scope of the present invention as defined in detail in the appended claims.

FIG. 3 is a detail defined as A in FIG. 1, at higher scale.

Figure 1:
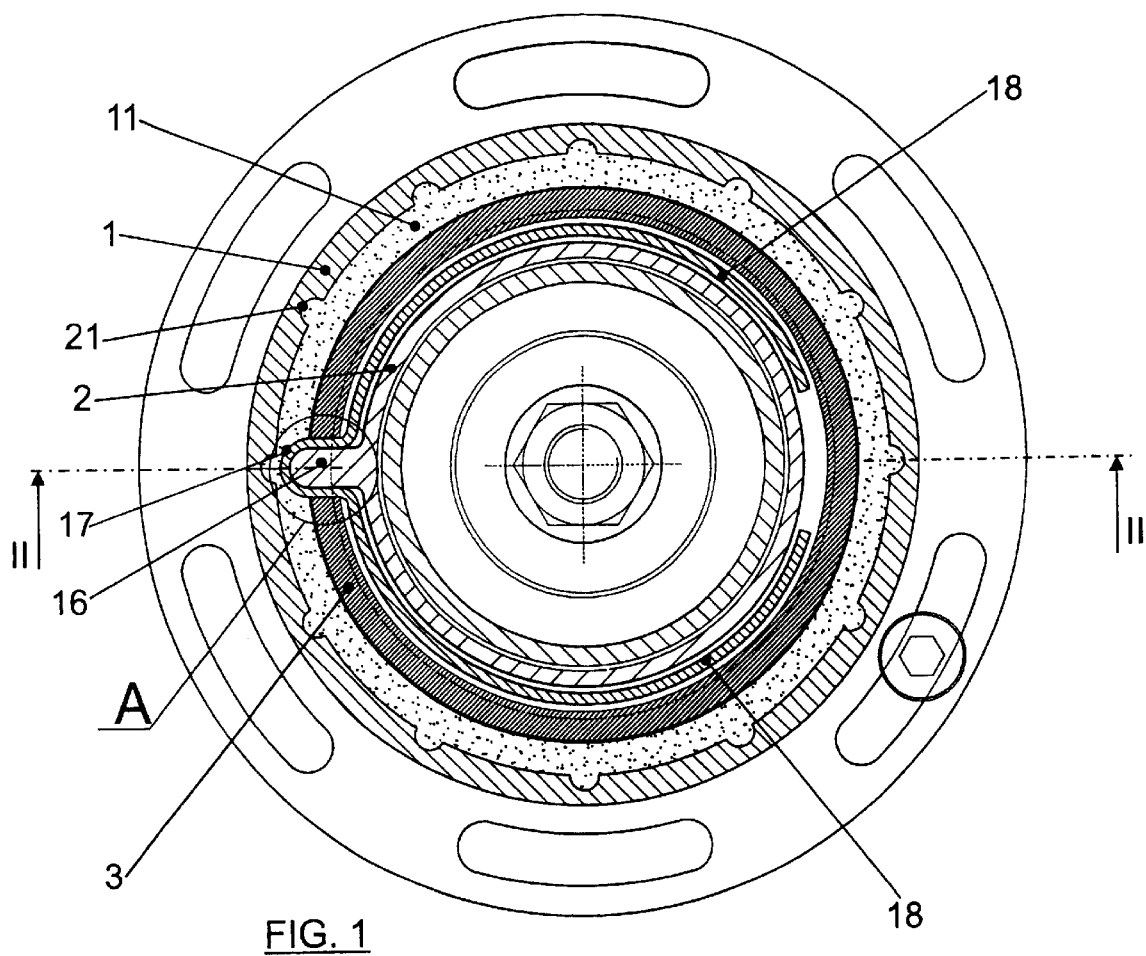
FIG. 1 is a transversal section of the mechanism, defined as I—I in FIG. 2.

The activation mechanism shown in figures includes an external cylindrical housing 1, an internal cylindrical frame 2 installed inside the housing 1, and a cylindrical sealing piece 3 made preferably from low friction material disposed in between the housing 1 and the frame 2.

The cylindrical housing 1 can include cylindrical pieces external 4 and internal 5 that are joined together by means of coincident flanges 6 that can be attached together by means of bolts 7. The internal piece 5 is provided with a bottom part 8 that are coupled, by means of a cotter 9, to a shaft 10 which provides a torque of an external source or an external actuation mechanism.

A band of fusible material 11 has been adhered to the internal surface of the piece 4. The fusible material is basically a metallic alloy with low melting temperature.

Figure 2:
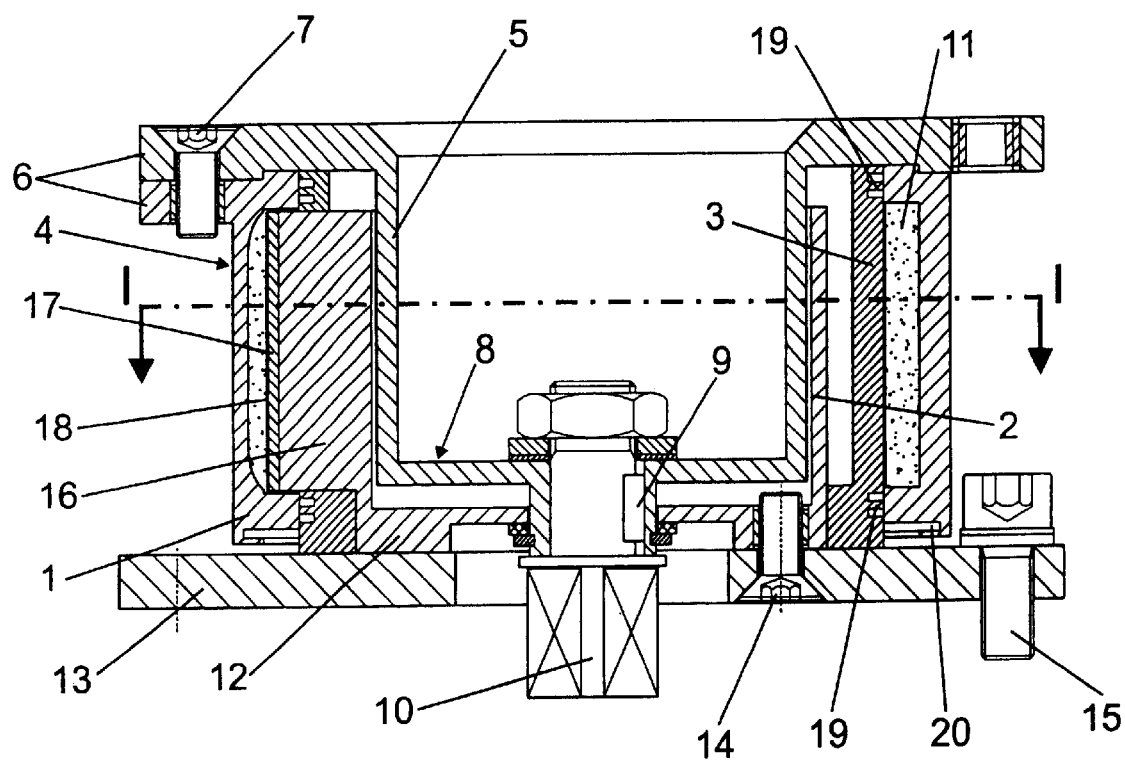
FIG. 2 is a diametrical section of the mechanism, defined as II—II in FIG. 1.

The frame 2 includes, as shown in FIG. 2, a bottom part 12, fixed to the mounting flange 13, joined, for instance, with bolts 14. That flange 13 should be the fixed mounting point. This frame 2 has additionally a radial protrusion 16 that passes though the wall of the cylindrical seal and penetrates inside the fusible alloy band 11. A strip of a material with very good thermal conductivity 17, copper as an example, covers the protrusion 16. That strip 17 is conformed as to cover the protrusion 16, gets inside the cylindrical sealing piece 3 though its slot, and extends around the frame 2 to both sides of the protrusion 16 in portions 18. Several thermal heaters (non represented) are installed in this portions 18 of the strip 17, being capable of generating heat to be transmitted by the strip 17 up to the protrusion area 16, as to fuse progressively the fusible alloy band 11.

The protrusion 16 with the strip 17 defines a thermal key, which can be activated by the heaters installed in portions 18 of the strip 17.

As shown in the FIG. 3, the cylindrical sealing piece 3 is slightly separated from the fusible alloy band 11.

As shown in the FIG. 1, the external cylindrical piece of the housing 1 has internal axial grooves 21, in which the fusible alloy band 11 penetrates, guaranteeing the good adherence between both components when the fusible alloy is in solid state.

Isolating tape 19 is disposed between the frame 2 and the strip 17.

As shown in FIG. 2, the cylindrical sealing piece 3 closes at its ends the cavity for the fusible alloy band 11, providing, in the contact areas between sealing piece 11 and housing 1, perimetrical grooves 20 to improve the sealing and the contention of the fusible alloy 11 when melted by the activation of the thermal key composed by the protrusion 16 and the strip 17 covering it.

Taking into account the exposed constitution, when the heaters mounted in the portions 18, are activated, the strip 17 is heated up to reaching the temperature necessary to start the change from solid to liquid of the fusible alloy band 11 in the contact with the strip 17. Due to the torque provided by the external acting mechanism, the relative movement between the housing 1 and the frame 2 starts. When maintaining the heaters mounted on the portions 18 of the strip 17 activated, the thermal key composed by the protrusion 16 and its covering strip 17, keep on melting the fusible alloy band 11, progressing the relative movement between housing 1 and frame 2, meaning the continuation of the appendage deployment.

Alternatively, the fusible alloy band could be adhered to the external surface of the internal piece 5 of the housing. In that case, the protrusion 16 should be disposed towards the inside of the device.

The mechanism can include further thermal isolation provisions for the fusible alloy, the thermal key and the thermal conductive strip, to achieve better thermal efficiency.

The characteristics of the invention are applicable also to mechanism with a plane configuration instead of cylindrical, as the one described, being then applicable to non rotary deployments.

What is claimed is:

1. A remote activation mechanism for equipment regulated deployment or release, characterised by being composed of a cylindrical housing connected with the external equipment to be deployed including the acting mechanism, having adhered a fusible material band in its internal surface; a cylindrical frame disposed inside the housing connected with the fixed part of the equipment, separated from the fusible material band, with means to progressively perform the fusion of the fusible material band; and a sealing cylindrical piece disposed between the fusible material band and the cylindrical frame, that avoids any leakage of the fusible material out of the housing when it is in liquid state; said cylindrical frame has a radial protrusion that stands out of the cylindrical sealing piece and penetrates in the fusible material band, being covered by a strip with very good thermal conductivity that is conformed on the protrusion and extends to one or both sides of the protrusion in portions around the frame, being those portions provided with adjustable heating means, capable of heating the strip on the protrusion, fusing progressively the fusible material band.

2. A mechanism as in claim 1, wherein said cylindrical housing is provided in its internal surface with axial grooves in which the fusible alloy band penetrates, as to avoid any sliding possibility between fusible material band and housing, while the fusible material is in solid state.

3. A mechanism as in claim 1, wherein said cylindrical frame with said protrusion is covered with an isolating material layer to minimise the heat losses between said strip of good thermal conductive material and said cylindrical frame.

4. A mechanism as in claim 1, wherein said cylindrical sealing piece is made of a low fraction thermal isolating material and closes against the said cylindrical housing both ends of the fusible material shaped as a cylinder, by using contact surfaces provided with perimetrical grooves that avoid leakage and optimise the contention of the fusible material when it is in liquid state.

5. A mechanism as in claim 1, wherein said cylindrical sealing piece has its external surface slightly separated from the said fusible material band.

6. A mechanism as in claim 1, wherein the said fusible material band is made of a low melting temperature metallic alloy.

* * * * *